United States Patent
Woods et al.

(10) Patent No.: US 12,054,294 B2
(45) Date of Patent: Aug. 6, 2024

(54) BRACKET FIXTURE FOR SPACE HABITAT

(71) Applicant: Sierra Space Corporation, Broomfield, CO (US)

(72) Inventors: Grant Robert Woods, Littleton, CO (US); Jeffrey S. Hickerson, Erie, CO (US); Charles Ralph Sandy, Camden, DE (US)

(73) Assignee: Sierra Space Corporation, Broomfield, CO (US)

( * ) Notice: Subject to any disclaimer, the term of this patent is extended or adjusted under 35 U.S.C. 154(b) by 112 days.

(21) Appl. No.: 17/717,989

(22) Filed: Apr. 11, 2022

(65) Prior Publication Data

US 2022/0396379 A1 Dec. 15, 2022

Related U.S. Application Data

(60) Provisional application No. 63/209,353, filed on Jun. 10, 2021.

(51) Int. Cl.
*B64G 1/22* (2006.01)
*B64G 1/60* (2006.01)

(52) U.S. Cl.
CPC .............. *B64G 1/60* (2013.01); *B64G 1/2227* (2023.08)

(58) Field of Classification Search
CPC ........... B64G 1/60; B64G 1/12; B64G 1/2227
See application file for complete search history.

(56) References Cited

U.S. PATENT DOCUMENTS

| | | | |
|---|---|---|---|
| 6,899,301 B2 | 5/2005 | Bigelow | |
| 7,509,774 B1 * | 3/2009 | Johnson | ................... B64G 1/12 52/2.25 |
| 2005/0120638 A1 * | 6/2005 | Bigelow | ................. B63B 7/082 52/2.25 |

FOREIGN PATENT DOCUMENTS

| CN | 105059567 B | 3/2017 |
|---|---|---|
| KR | 20180096035 A | 8/2018 |

* cited by examiner

*Primary Examiner* — Tye William Abell
(74) *Attorney, Agent, or Firm* — Mintz Levin Cohn Ferris Glovsky and Popeo, P.C.

(57) ABSTRACT

Methods, devices, and systems are described for a bracket fixture for securing a load to a soft goods layer in a space habitat. The bracket fixture includes a base having a plurality of sides, the plurality of sides having a pin parallel to its respective side, and an aperture between the pin and the respective side. The bracket fixture further includes a protrusion extending from the base, the protrusion including a fixture element.

20 Claims, 12 Drawing Sheets

BRACKET FIXTURE FOR SPACE HABITAT

CROSS-REFERENCE TO RELATED APPLICATIONS

This application claims priority to U.S. Provisional Application No. 63/209,353 entitled "BRACKET FIXTURE FOR SPACE HABITAT" and filed on Jun. 10, 2021, the disclosure of which is incorporated herein by reference in its entirety.

STATEMENT OF GOVERNMENT SPONSORED SUPPORT

Certain aspects of the subject matter described herein were developed with U.S. Government support under Contract No. 80HQTR17C0009 awarded by NASA. The U.S. Government has certain rights in the invention.

TECHNICAL FIELD

The present disclosure relates generally to fixtures, and more particularly, to a bracket fixture for a space habitat.

BACKGROUND

Space habitats are needed to support mission activities in space. The space habitat may be formed from a core and a bladder surrounding the core. The bladder may be stowed uninflated within a launch vehicle. Once in space, the space habitat may inflate and become pressurized to support human activity in space. The pressurized bladder may be susceptible to air leaks, which poses significant safety concerns to inhabitants and equipment. More worrisome, the bladder may be stressed under the weight of heavy loads, which causes an uneven stress distribution across the bladder.

SUMMARY

The present disclosure provides methods, systems, and articles of manufacture for a bracket fixture for a space habitat.

In one aspect, there is provided a bracket fixture for securing a load to a soft goods layer in a space habitat. The bracket fixture comprises a base having a plurality of sides, the plurality of sides having a pin parallel to its respective side and an aperture between the pin and the respective side. The bracket fixture comprises a protrusion extending from the base, the protrusion including a fixture element.

In some variations, the plurality of sides includes at least two members extending horizontally beyond the base, the at least two members extending from a corner of the base, and the at least two members being separated by the pin. Further, the protrusion extends at an angle approximately perpendicular from the base, and wherein the pin is connected at distal ends of the two members to enclose the aperture between the pin and the respective side. Additionally, the bracket fixture further comprises a webbing loop wrapped around the pin to secure the base to the soft goods layer, the webbing loop configured to pass through the aperture between the pin and the respective side. Further, the bracket fixture further comprises a cord loop aperture at the base, the cord loop aperture configured for a cord loop configured to connect the base of the bracket fixture to the soft goods layer.

In some variations, the pin is detachable from the plurality of sides, wherein the protrusion is centered on the base, and the fixture element includes at least one of a hook, a slot, an opening, and a female threading. In some variations, the bracket fixture further comprises a bladder flange having a flange base that radially extends from the bladder flange. The bracket fixture further comprises a thermoformed cone bonded to the flange base. The bladder flange is configured to be placed over the protrusion and the thermoformed cone provides a protective layer for a bladder. In some variations, the bracket fixture further comprises an O-ring around a circumference of the protrusion. Placing the bladder flange over the O-ring creates a seal around the O-ring. Further, the plurality of sides includes at least four sides, and wherein the webbing loop wraps around each of the at least four sides via the pin.

In another aspect, there is provided a method for securing a bracket fixture to a space habitat with a bladder. The method comprises securing the bracket fixture to a soft goods layer covering the bladder, the bracket fixture including a protrusion and a base having a plurality of sides, the plurality of sides having a pin parallel to its respective side and an aperture between the pin and the respective side, the protrusion extending from the base and including a fixture element. The method also comprises placing a bladder flange over the bracket fixture, the bladder flange having a flange base that radially extends from the bladder flange, the flange base being bonded to a thermoformed cone to provide a protective layer for the bladder.

In some variations, the method further comprises securing a felt washer over the protrusion of the bracket fixture to cushion the bladder from the bracket fixture, the felt washer configured to cover a portion of the bladder proximate to the bladder flange. Additionally, the method further comprises placing a retaining ring over the bladder flange to prevent movement of the bladder flange with respect to the bracket fixture. In some variations, the protrusion includes an O-ring around its circumference and wherein placing the bladder flange over the O-ring creates a seal around the O-ring.

In yet another aspect, there is provided a bracket fixture system for securing a load to a soft goods layer in a space habitat. The bracket fixture system comprises a bracket fixture including a base having a protrusion and a plurality of sides, the protrusion extending from the base and including a fixture element, the plurality of sides having a pin parallel to its respective side and an aperture between the pin and the respective side. The bracket fixture system comprises a webbing loop wrapped around the pin to secure the base to the soft goods layer, the webbing loop configured to pass through the aperture between the pin and the respective side. The webbing loop is configured to attach to the soft goods layer at the space habitat.

In some variations, the plurality of sides includes at least two members extending horizontally beyond the base, the at least two members extending from a corner of the base, and the at least two members being separated by the pin. In some variations, the protrusion extends at an angle approximately perpendicular from the base, and wherein the pin is connected at distal ends of the two members to enclose the aperture between the pin and the respective side. In some variations, the pin is detachable from the plurality of sides. Additionally, the bracket fixture system further comprises a cord loop aperture at the base, the cord loop aperture configured for a cord loop configured to connect the base of the bracket fixture to the soft goods layer.

Further, the protrusion is centered on the base, and the fixture element includes at least one of a hook, a slot, an opening, and a female threading. In some variations, the bracket fixture system further comprises a bladder flange having a flange base that radially extends from the bladder flange. The bracket fixture system further comprises a thermoformed cone bonded to the flange base. The bladder flange is configured to be placed over the protrusion and the thermoformed cone provides a protective layer for a bladder.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

Figure 1A:
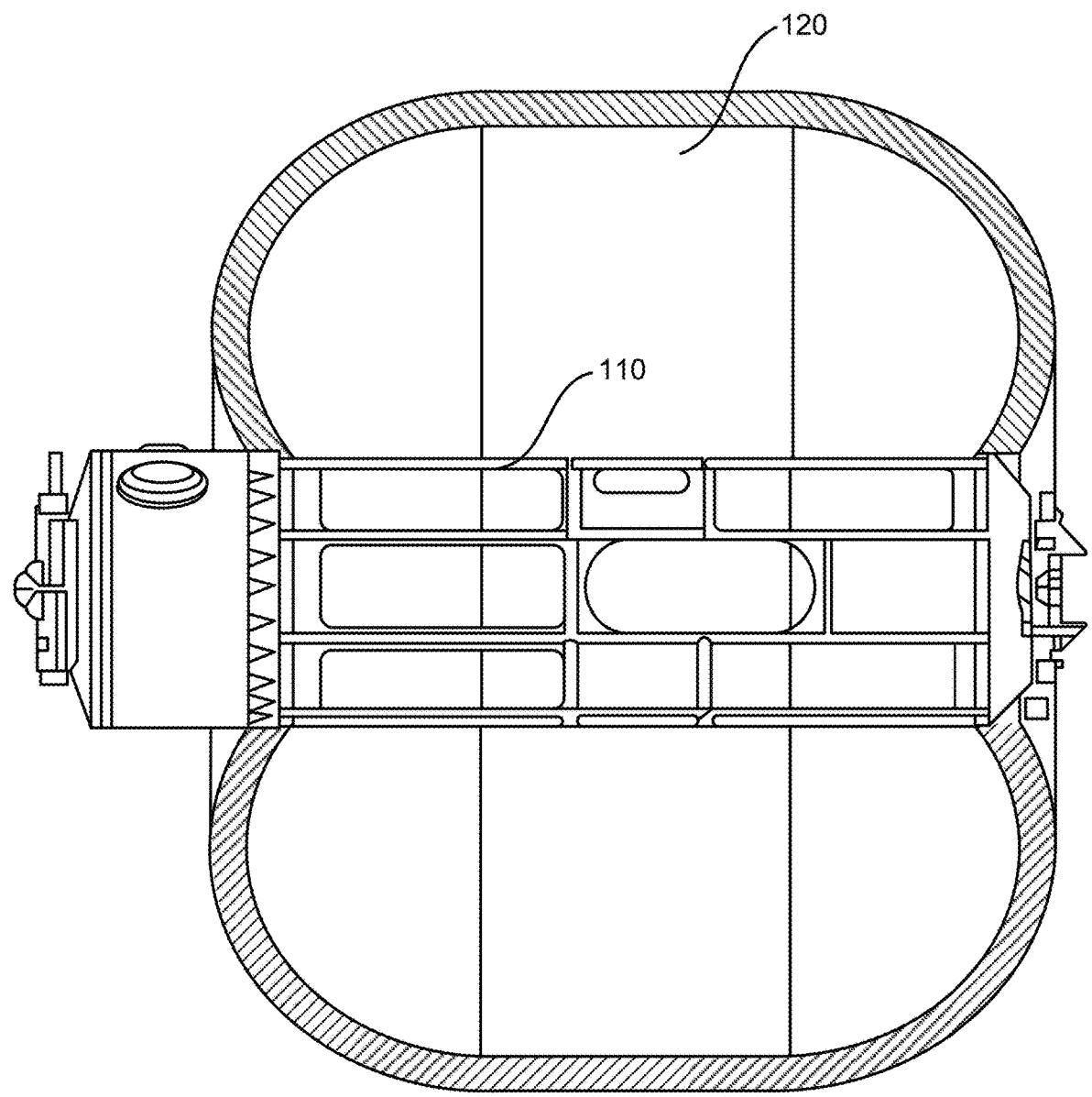
FIG. 1A depicts an example of a diagram representative of a cross-section of a space habitat having a core and bladder.

The space habitat may be formed from a core and a bladder surrounding the core. A soft goods layer, such as a webbing, may support the bladder under pressure loads and provide an even weight distribution across the bladder. The soft goods layer may include a webbing of straps with a basket-weave configuration to maintain the shape of the bladder and prevent strain to the bladder. The soft goods layer may also provide an interface with secondary structures inside of the space habitat. Examples of secondary structures may include flooring, partitions, equipment racks, and cargo nets inside the space habitat to support mission activities. The secondary structures may be connected to the soft goods layer to prevent air leaks and strain on the pressurized bladder. But a fixture interface with the soft goods layer is needed to properly secure the secondary structures while still providing a safe, pressurized environment.

A fixture capable of supporting a large load should sustain unplanned movement of secondary structures within the habitat while preventing air leaks that might compromise the safety of inhabitants and equipment. Further, the fixture should be taught to increase the likelihood that the equipment connected to the soft goods did not move or sag. Thus, a strong fixture interface with the secondary structures and the soft goods layer is required to properly secure the secondary structures within the habitat while still providing a safe pressurized environment.

A bracket fixture may interface with the soft goods layer to properly secure the heavy structures within the habitat. The bracket fixture may increase the likelihood that heavy loads (e.g., flooring, partitions, equipment racks, and cargo nets) are secured and immobile for the safety of the inhabitants and equipment inside the space habitat. The bracket fixture may also increase the likelihood that the weight of these heavy loads is isolated to the soft goods and may prevent compromising the integrity of the bladder. The bracket fixture may increase the likelihood of proper weight distribution across the soft goods. Otherwise, these heavy loads may cause strain and uneven weight distribution across the bladder.

The bracket fixture interface may include a base, four sides with pins around which webbing loops are secured, and a central protrusion containing a fixture element configured to attach to the habitat structures. The bracket fixture may interface directly with the soft goods layer of the space habitat. For example, the bracket fixture may be centered on the intersection of a pair of hoop and axial webbings. Additionally, cords may prevent the bracket fixture from being pulled away from the restraint layer and are designed to take a minimal axial load.

The bracket fixture may be configured to connect to secondary structures inside the space habitat. For example, the bracket fixture may be configured to couple to flooring, partitions, equipment racks, cargo nets, and/or the like. The bracket fixture may interface with the soft goods (e.g., the hoop and axial webbing) to properly secure heavy habitat structures while still providing a safe, pressurized environment.

The bladder may be installed over the bracket fixture with an integrated bladder flange. The bladder flange slides over the barrel section of the bracket fixture and is secured with a retaining ring. The resulting assembly may provide a bracket fixture for attaching internal equipment while maintaining the airtight integrity of the bladder.

The methods, systems, and apparatuses described herein are for a bracket fixture configured to connect secondary structures to a soft goods interface while maintaining the airtight integrity of the bladder. The various embodiments also support loads applied to the secondary structures by crewmember activity as well as inertial loads imposed during operations related to the space habitat.

FIG. 1A depicts an example of a diagram representative of a cross-section of a space habitat having a core and bladder. The space habitat may be formed from a core 110 and a bladder 120 coupled to the core 110. The bladder 120 may connect to the far ends of the core 110. The bladder 120 may expand out from the core 110 when pressurized. The bladder 120 may have a toroid shape about the core 110.

The core 110 may be a rigid frame for the space habitat. The core 110 may have a cylindrical shape with a hollow interior. The hollow interior may allow cargo and persons to pass from one end of the core 110 to the other end of the core 110. The core 110 may include openings at the far ends of the core 110. The openings may allow the space habitat to interface with other space structures to receive cargo or personnel. For example, the core 110 may be attached to a vestibule for receiving cargo. In another example, the core 110 may include a pressurization cap to maintain the pressure inside of the core 110.

The bladder 120 may be connected to the ends of the cylindrical core 110. The bladder 120 may be stored uninflated at the core 110 to minimize its footprint prior to launch. Following launch, the bladder 120 may inflate under pressure. The pressurized bladder 120 may support human activity in space. The bladder 120 may be stressed by the pressurization, which potentially poses significant safety concerns to inhabitants and equipment. For example, an air leak may result at the interface between the core 110 and the bladder 120. In another example, flooring, partitions, equipment racks, and cargo nets may need to be connected to the bladder 120, potentially causing uneven stress distribution across the bladder 120.

The bladder 120 may be a component for retaining gas. The bladder 120 may create an airtight seal for the space habitat. The bladder 120 may have a low gas permeability. The bladder 120 may maintain pressurized air inside the habitat to support human life. The bladder 120 may be symmetrical about the core 110. For example, the bladder 120 may retain a toroid shape about the core 110. In another example, the bladder 120 may have a spherical shape about the core 110. In some embodiments, the bladder 120 may bulge outward at the area proximate to the core 110. In some embodiments, the bladder 120 may have the shape of a wheel at the portion furthest from the core 110.

The bladder 120 may be pressurized to fill a soft goods layer 150. The soft goods layer 150 may be a restraint on the shape and size of the bladder 120. For example, the bladder 120 may be pressurized to fill the contours of an axial and hoop webbing restraint. The bladder 120 may be slightly oversized relative to the soft goods layer 150 to ensure full support of the bladder 120 by the soft goods layer 150 under pressure. The bladder 120 may elongate to increase the likelihood that the bladder 120 reaches the constraining contours of the axial and hoop webbing restraints.

Figure 1B:
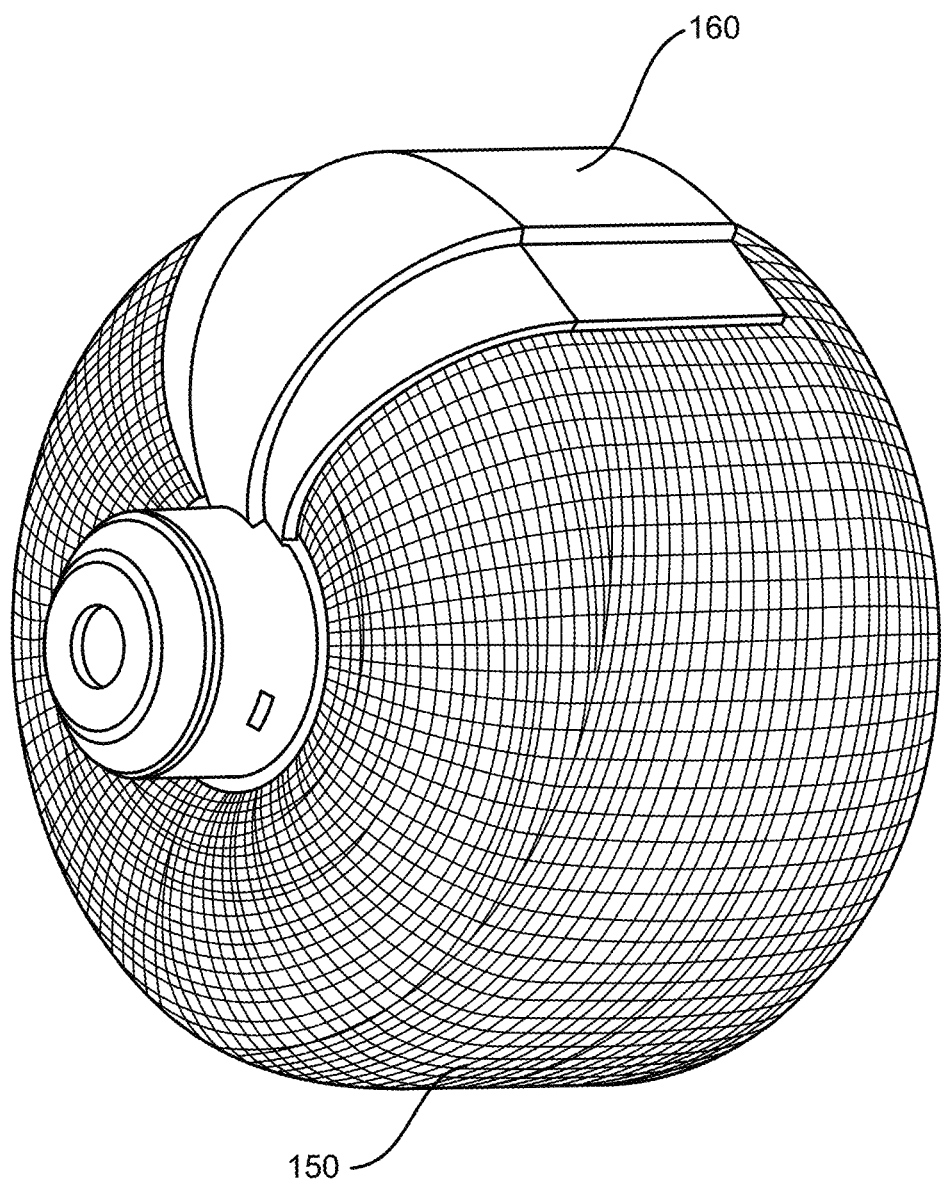
FIG. 1B depicts an example of a diagram representative of a space habitat including a core attached to a vestibule and a bladder covered with a soft goods layer and a debris shield.

FIG. 1B depicts an example of a diagram representative of a space habitat including a core 110 attached to a vestibule and a bladder 120 covered with a soft goods layer 150 and a debris shield 160. The soft goods layer 150 may cover the bladder 120 and be interposed between the debris shield 160 and the bladder 120.

The soft goods layer 150 may be wrapped around the bladder 120. The soft goods layer 150 may comprise an axial and hoop webbing. The axial and hoop webbing may reinforce the bladder 120 and prevent uneven stress distribution across the bladder 120. The axial and hoop webbing may be configured to increase the likelihood that the bladder 120 retains its shape. The axial and hoop webbing may be woven together to create an even stress distribution across the bladder 120. For example, the axial webbing may alternate between going over and under the hoop webbings. Additionally, and/or alternatively, the hoop webbing may alternate between going over and under the axial webbings. Various weave patterns may be created between the axial and hoop webbings. The axial and hoop webbing may be spaced around the circumference of the bladder 120. The axial and hoop webbing may be made of Vectran. A hoop strap may be joined to the axial strap with a stitching, an adhesive, and/or the like. Similarly, the axial strap may be joined to the hoop strap with a stitching, an adhesive, and/or the like.

The debris shield 160 may be wrapped around the axial and hoop webbing. The debris shield 160 may protect the bladder 120 and axial and hoop webbing from debris in space. The debris shield 160 may be made from multiple layers of foam. A vestibule may be connected to either side of the core 110. The vestibule may be an interface for connecting to an external space structure. The vestibule may be a transition chamber between the space habitat and the external space structure. Either side of the vestibule may include a selectively removable air pressure door configured to seal off pressure between the vestibule and the external spacecraft.

Figure 2:
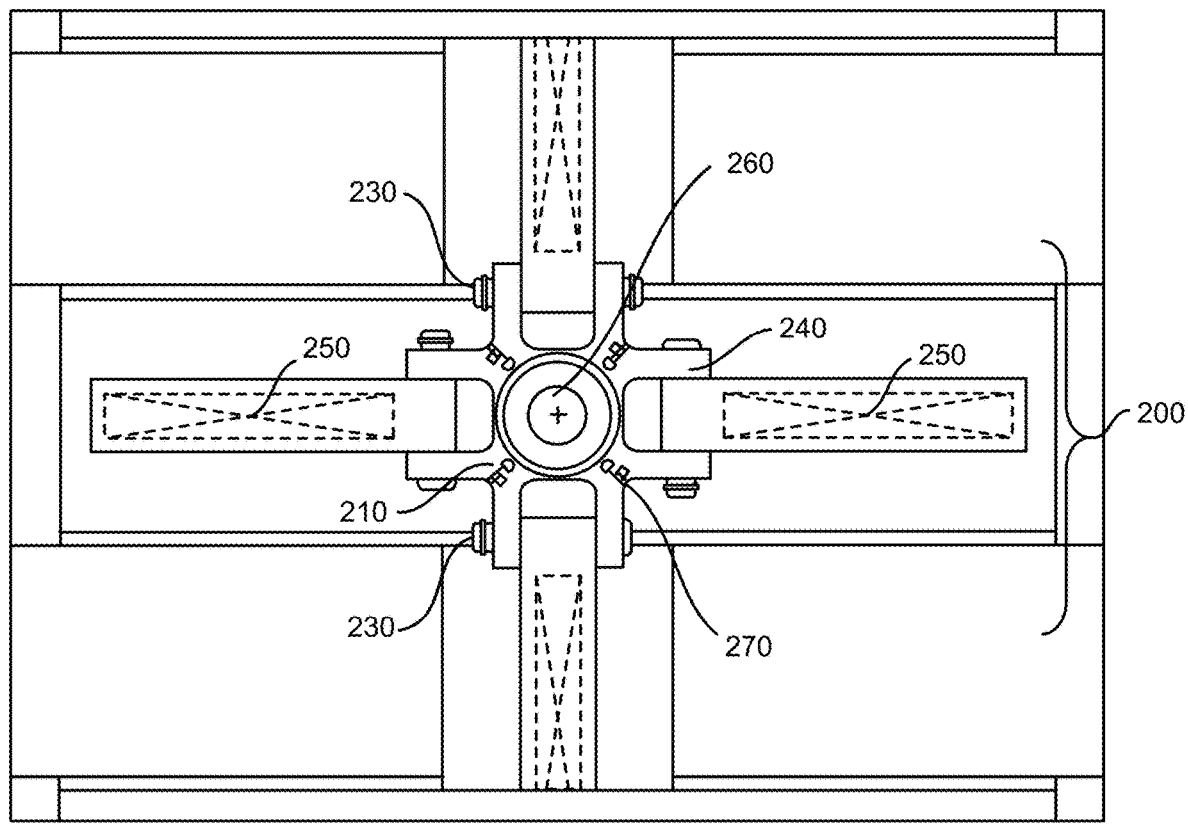
FIG. 2 depicts an example of a diagram representative of a top-view of a bracket fixture attachable to soft goods of a space habitat.

FIG. 2 depicts an example of a diagram representative of a top-view of a bracket fixture attachable to soft goods of a space habitat. The space habitat may require flooring, partitions, equipment racks, and cargo nets to conduct activities in the space habitat. The flooring, partitions, equipment racks, cargo nets, and/or the like may be connected to the soft goods surrounding the bladder 120 of the space habitat. These heavy loads may cause strain and uneven distribution on the bladder 120. The bracket fixture 200 may reduce the strain on the bladder 120 by connecting the heavy loads (e.g., flooring, partitions) to the soft goods surrounding the bladder 120. Mounting the bracket fixture 200 to the soft goods prevents safety hazards due to the added heavy loads. The bracket fixture 200 may evenly distribute the weight of the flooring, partitions, equipment racks, and cargo nets to prevent strain on the bladder 120. The bracket fixture 200 may interface with the soft goods (e.g., the hoop and axial webbing) to properly secure heavy habitat structures while still providing a safe, pressurized environment.

With reference to FIG. 2, the bracket fixture 200 may include a base 210. The base 210 may include a flat or contoured surface that may be mounted to the interior portion of a space habitat. The flat surface of the base 210 may maintain contact with the soft goods (e.g., webbing). The flat surface may be on the backside of the base 210. The flat surface of the bracket fixture 200 may be flush against the interior portion of the space habitat. For example, the flat surface may be mounted to soft goods in the space habitat covering the bladder 120. The bracket fixture 200 may be centered on the intersection of a pair of hoop and axial webbings. In some embodiments, the backside of the base 210 may be curved to match the contour of the bladder 120.

The base 210 of the bracket fixture 200 may include four sides. Each of the sides may provide in-plane load support for the space habitat. The base 210 may have a square, parallelogram, or rectangular shape base on the four sides. The four sides may be perpendicular to one another. The corners of the base 210 may form right angles. The sides of the base 210 may be aligned with a webbing. For example, the base 210 may have four sides to correspond to a cross-hatch style webbing. In some embodiments, the base 210 may be located on one of the axial/hoop webbing crossover points.

Each of the four sides may include an element that attaches to the soft goods. In some embodiments, each of the four sides may include a pin 230. The pin 230 may extend parallel to its respective side. The pin 230 may have a cylindrical shape and may be detachable from the side of the base 210. The pin 230 may be situated to create an aperture between the pin 230 and the respective side of the base 210. The aperture may allow a loop to wrap around the pin 230 between the pin 230 and the side of the base 210. Additionally, and/or alternatively, the aperture may be built into the side of the base 210. For example, the aperture may be a slot at each of the four sides. In some embodiments, the aperture may be created directly at the base 210. As such, the pin 230 at each of the sides may be integrated into each of the sides. The pin 230 may secure the bracket fixture 200 to the soft goods to provide in-plane load support for the space habitat. In some embodiments, each of the four sides may include multiple pins for attaching to multiple webbings at each side. In some embodiments, the sides may include a clevis fastener including a clevis and a clevis pin. The clevis pin may be a bolt with a cross-hole for a clevis pin.

With reference still to FIG. 2, each of the four sides may include at least two members 240. The two members 240 may form a U-shape. The two members 240 may extend horizontally from the base 210. The bottom portion of the two members 240 may be flush with the flat surface of the base 210. The top portion of the two members 240 may be flush with the top edge of the base 210. The two members 240 may extend from opposite ends of the side. For example, the two members 240 may extend from the corners formed by the sides. The two members 240 may be approximately perpendicular to its respective side. In some embodiments, the two members 240 may extend at an approximately perpendicular angle from its respective side at the corners of the base 210. The two members 240 may be spaced apart from each other as they extend horizontally from its respective side. Two members 240 may be configured to sustain a pin 230.

Each of the members may include an opening at the distal end. The opening at the distal end may be configured to receive the pin 230. The pin 230 may extend at an approximately perpendicular angle from the two members 240. The pin 230 may be configured to fit in the opening of the two members 240. The pin 230 may be configured to be detachable from the two members 240. The pin 230 may extend beyond the opening in the two members 240 to the other side. The pin 230 may have a thicker diameter at the portion extending beyond the opening than the portion between the two members 240. In some embodiments, the pin 230 may be cylindrical to fit in the openings of the two members 240. Additionally, and/or alternatively, the pin 230 may have a rectangular shape, a square shape, a hexagonal shape, and/or the like. The alternative shapes of the pin 230 may increase the friction of the webbing loop 250 around the pin 230. The pin 230 may be a clevis pin configured to engage webbing loop 250 that is sewn to the webbing restraint.

Each pin 230 may have a webbing loop 250 wrapped around it. The webbing loop 250 may be configured to wrap around the pin 230 to secure the base 210 to the interior wall of soft goods. The webbing loop 250 may include one end for wrapping around the pin 230 and another end for attaching to the interior wall of the soft goods. The end for attaching to the interior wall may be attached via a fastener, ties, staples, stitches, knots, and/or the like. The end of the webbing loop 250 may connect to a webbing, a bladder 120, a strap, a liner, and/or the like at the interior wall of the soft goods. The webbing loop 250 may be made of Kevlar. In some embodiments, the loading of the bracket fixture 200 may result in the tensile loading of the webbing loop 250. The tensile loading of the webbing loop 250 may transfer the load attached to the bracket fixture 200 onto the webbing of the soft goods.

With reference still to FIG. 2, the base 210 may include a protrusion 260. The protrusion 260 may be centered in the base 210 and extend away from the interior wall of the soft goods. The protrusion 260 may include a fixture element to support a load. The fixture element may include at least one of a hook, a slot, an opening, and a female threading. The female threading may be configured to receive a bolt or a screw from the load. The protrusion 260 may extend at an angle approximately perpendicular to the base 210. The protrusion 260 may have a cylindrical shape with a diameter wider than the female threading.

In some embodiments, the base 210 may include a cord loop aperture 270. The cord loop aperture 270 may be in the corner of the base 210. A cord loop made of Vectran may loop through the cord loop aperture 270 and connect to the webbing directly beneath the base 210 of the bracket. The cord loop may prevent the bracket fixture 200 from being pulled away from the restraint layer. In some embodiments, a cord loop aperture 270 may be in each corner of the base 210 to connect the cord loop directly beneath the base 210 of the bracket. The cord loop wrapping through the cord loop aperture 270 may prevent separation between the webbing and the bottom surface of the base 210. In some embodiments, the cord loops may pass through the restraint webbing and holes in the corners of the bracket fixture 200 to further immobilize the bracket fixture 200. In some embodiments, the cord loop aperture 270 may be at each corner of the base 210.

Figure 3:
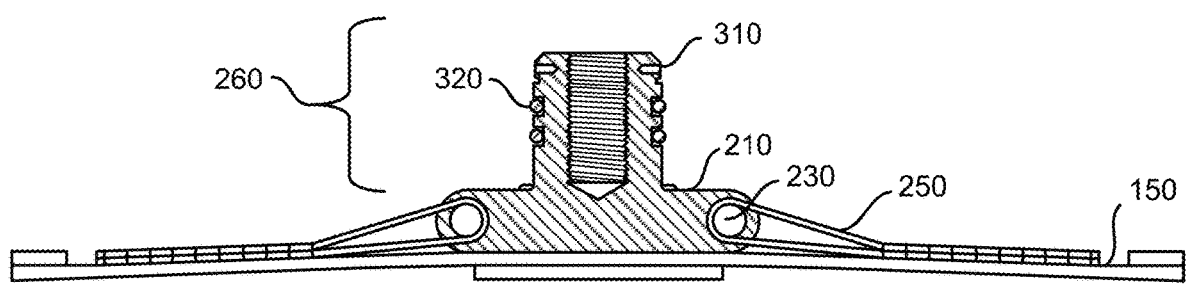
FIG. 3 depicts an example of a diagram representative of a side-view of a bracket fixture attachable to soft goods of a space habitat.

FIG. 3 depicts an example of a diagram representative of a side-view of a bracket fixture 200 attachable to soft goods of a space habitat. The bracket fixture 200 may be mounted over an intersection of an axial strap and a hoop strap. The flat surface of the base 210 may be flush with the hoop strap. The webbing loop 250 may be wrapped around the pin 230 of the bracket fixture 200. The webbing loop 250 may be configured to attach to the hoop strap via a stitching, an adhesive, and/or the like.

In some embodiments, the protrusion 260 may include a spanner hole 310. The spanner hole 310 may rotationally restrain the bracket fixture 200 as the structure is being installed. The spanner hole 310 may be incorporated into the protrusion 260 to prevent rotational movement during the installation of the load to the bracket fixture 200. Multiple bracket fixtures may be located on the soft goods to prohibit torque being applied to a bracket fixture 200.

In some embodiments, the protrusion 260 may include an O-ring 320. The O-ring 320 may extend radially around the protrusion 260. The O-ring 320 may create a pressure seal between the bladder 120 and the interior of the space habitat. The pressure seal may be created when the bladder flange is placed over the bracket fixture 200.

The protrusion 260 may include an opening configured to attach to the secondary structures. The opening may include threading for connecting to secondary structures. The bottom portion of the opening may include a cone shape configured to receive a screw. The protrusion 260 may also include a retaining ring groove configured to receive a retaining ring. The retaining ring may be configured to hold the bracket fixture 200 against the bladder 120.

Figure 4:
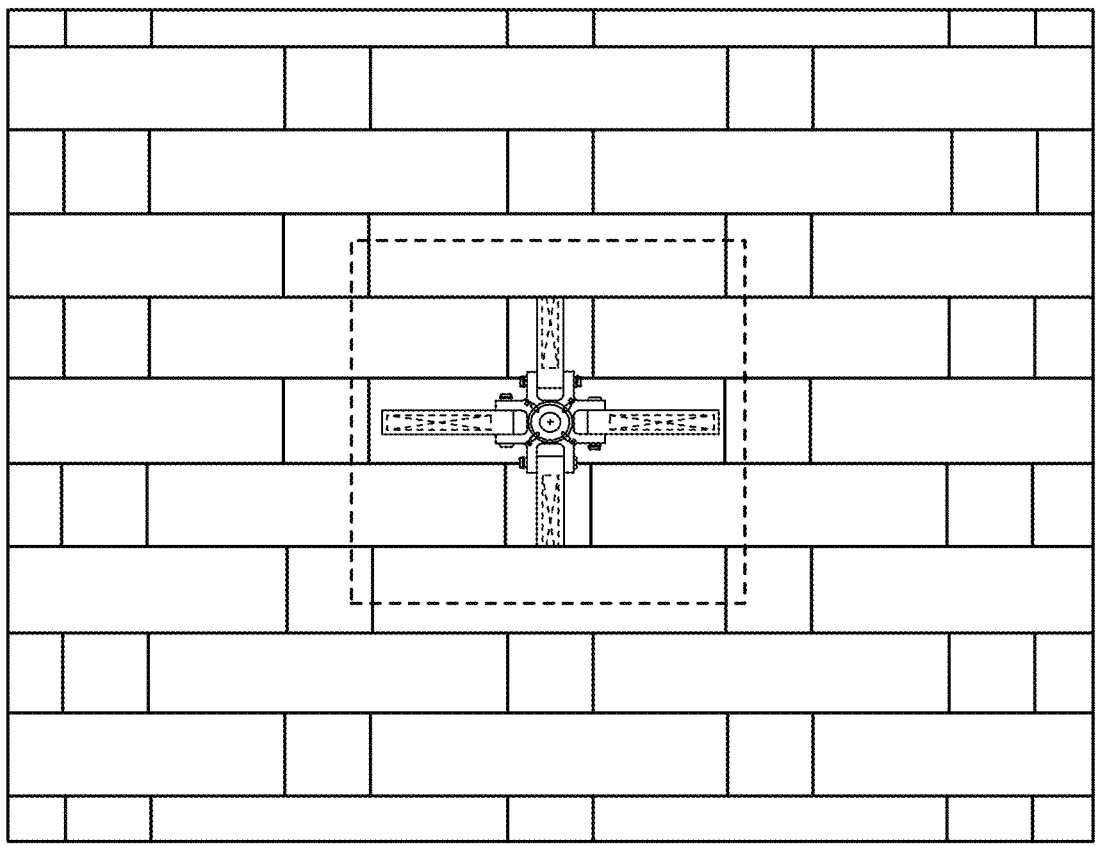
FIG. 4 depicts an example of a diagram representative of a top-view of a bracket fixture attached to soft goods by loop webbings.

FIG. 4 depicts an example of a diagram representative of a top-view of a bracket fixture 200 attached to soft goods by loop webbings. The bracket fixture 200 may be attached to a large grid of interweaving axial and hoop straps. Multiple bracket fixtures may be distributed across the gird of interweaving axial and hoop straps to support secondary structures.

Figure 5:
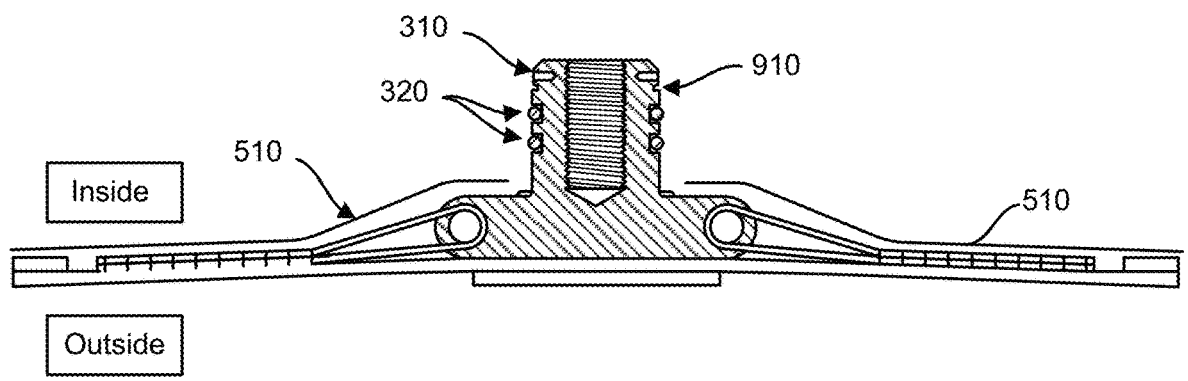
FIG. 5 depicts an example of a diagram representative of a side-view of a bracket fixture attached with a liner.

FIG. 5 depicts an example of a diagram representative of a side-view of a bracket fixture 200 with a liner. A liner layer may be placed between the bracket and the bladder 120 to protect the bladder 120 from interactions with the bracket fixture 200.

The liner 510 may protect the bladder 120 from the relatively rough surface of the soft goods. The liner 510 may be placed between the bladder 120 and the soft goods layer 150 to protect the bladder 120. The liner 510 may prevent the bladder 120 from protruding between the gaps in the soft goods. For example, the liner 510 may prevent the bladder 120 from protruding between the gaps in the hoop and axial webbings. The liner 510 may be fabricated from a nylon fabric. The liner 510 may include a light urethane coating on one side of the liner material to enable the liner 510 to be heat sealed together and avoid rough sewn seams rubbing against the bladder 120. This liner 510 may be slightly oversized relative to the restraint.

Figure 6:
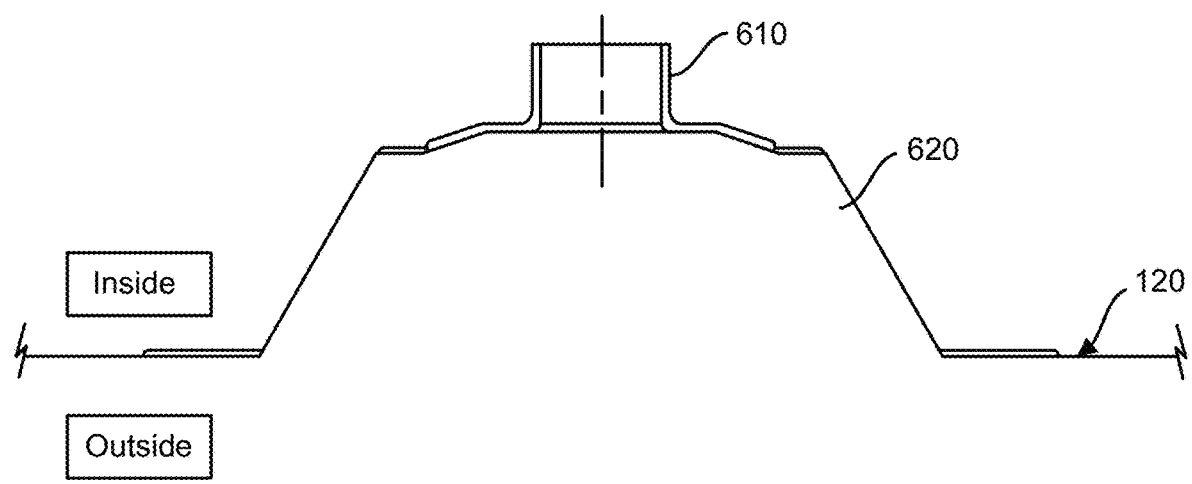
FIG. 6 depicts an example of a diagram representative of a bladder flange connected to a bladder.

FIG. 6 depicts an example of a diagram representative of a bladder flange 610 connected to a bladder 120. The bladder flange 610 may interface between the bracket fixture 200 and the bladder 120.

The bladder flange 610 may be a cylinder made of aluminum that may be coupled, assembled, or bonded to the interior portion of the bladder 120. The bladder flange 610 may also include a flange base that radially extends from the bladder flange 610. The flange base of the bladder flange 610 may be bonded to a thermoformed cone or bladder laminate. In some embodiments, both sides of the base of the bladder flange 610 may be bonded to a thermoformed cone 620 or bladder laminate.

The thermoformed cone 620 may be fabricated to bulge inward from an inside portion of the bladder 120. The thermoformed cone 620 may extend inward from the inside surface of the bladder 120. The thermoformed cone 620 may be truncated where the thermoformed cone 620 attaches to the bladder flange 610. The thermoformed cone 620 may connect to the interior surface of the bladder 120. The thermoformed cone 620 provides a protective layer for the bladder 120 at the bracket fixture 200.

Figure 7:
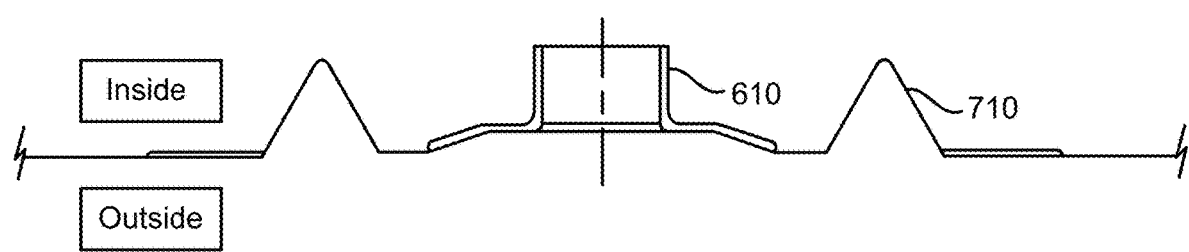
FIG. 7 depicts another example of a diagram representative of a bladder flange connected to a bladder.

FIG. 7 depicts another example of a diagram representative of a bladder flange 610 connected to a bladder 120.

The bladder flange 610 may be pushed down to be level with the bladder 120 and to integrate with the restraint. That is, the bladder flange 610 may be pushed outward to be level with the bladder 120 and to integrate with the restraint. The bladder flange 610 may cause the thermoformed cone 620 or bladder laminate to become partially inverted. The thermoformed cone 620 may bulge around the edges of the base of the bladder flange 610. In some embodiments, the thermoformed cone 620 may be inverted to half of its height with the cone pushed down.

The bladder flange 610 may be aligned with the bladder 120 when pushed down. Pushing the bladder flange 610 down may create a partially inverted thermoformed cone 710 710. The partially inverted thermoformed cone 710 may result in an airtight flexible seal that enables in-plane movement of the bladder flange 610 without disturbing the surrounding bladder 120. This has the added technical benefit of relaxing the positional accuracy requirement of the bladder 120 to the restraint at this interface.

Figure 8:
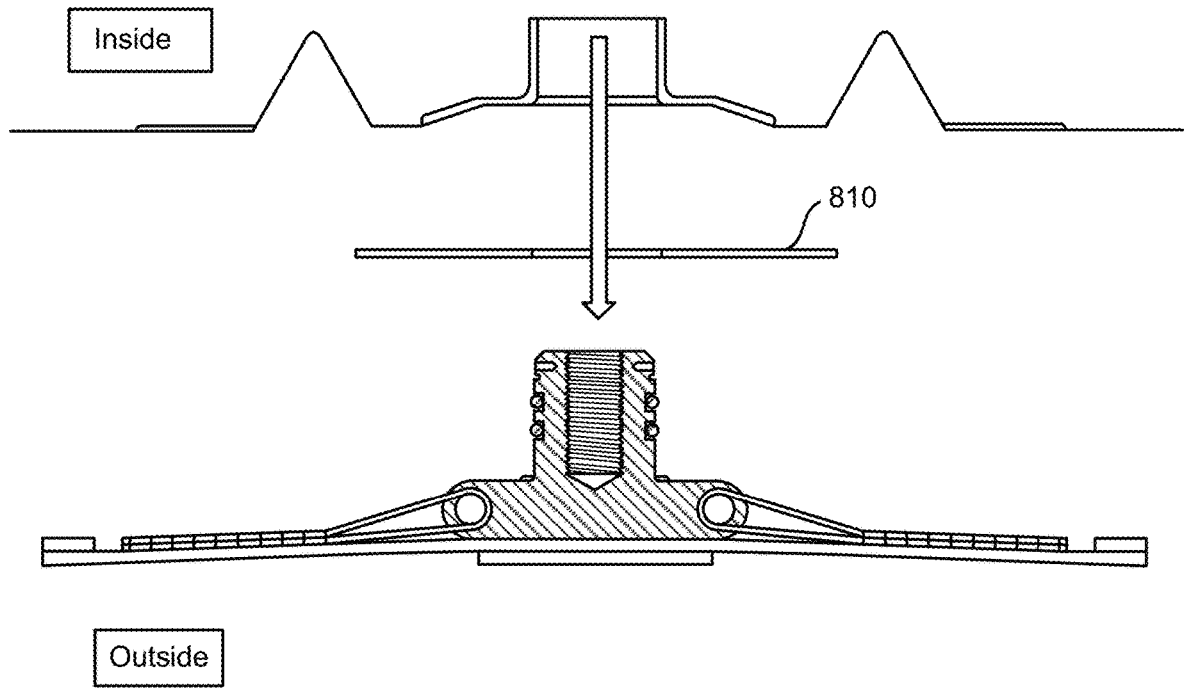
FIG. 8 depicts another example of a diagram representative of an exploded view of a bladder flange, a felt washer, and the bracket fixture.

FIG. 8 depicts another example of a diagram representative of an exploded view of a bladder flange 610, a washer 810, and the bracket fixture 200. The bladder flange 610 may be positioned over the bracket fixture 200. The webbing may be the outside layer while the bladder flange 610 with the partially inverted thermoformed cone 710 may be the inside layer.

The bladder flange 610 may be wider than the protrusion 260 of the bracket fixture 200. The bladder flange 610 may be pressed onto the bracket fixture 200 around the protrusion 260. The bladder flange 610 may engage with the O-rings on the protrusion 260 of the bracket fixture 200. The engagement of the bladder flange 610 with the O-rings may create an airtight seal. The bladder flange 610 may be configured to connect to a retaining ring at the bracket fixture 200 to retain the bladder flange 610. In some embodiments, the bracket fixture 200 may attach to the bladder flange 610 in the bladder layer. The bladder flange 610 may be restrained to the bracket fixture 200 by a retaining ring. In some embodiments, the retaining ring may engage with the O-rings on the protrusion 260 of the bracket fixture 200. The engagement of the bladder flange 610 with the O-rings may create an airtight seal.

A washer 810 may be placed over the protrusion 260 of the bracket fixture 200 to further cushion the bladder 120 from bearing on the bracket fixture 200 and the secondary structures. The washer 810 may be made from felt. The washer 810 may be placed over the bracket fixture 200 and extend over the side of the bracket fixture 200. The washer 810 may cover a portion of the bladder 120 near the bladder flange 610. The washer 810 may cover the partially inverted thermoformed cone 710. The partially inverted thermoformed cone 710 surrounding the bladder flange 610 may be covered by the washer 810 when collapsed under the pressurization of the space habitat. The bladder flange 610 may be placed over the felt washer 810 to prevent movement of the bracket fixture 200 around the bladder 120. The retaining ring may be placed over the bladder flange 610 to prevent movement of the bladder flange 610 with respect to the bracket fixture 200. Additionally, and/or alternatively, the retaining ring may be placed over the felt washer 810 to hold it in place and to form the seal between the retaining ring and bladder 120 and the bracket fixture 200.

Figure 9:
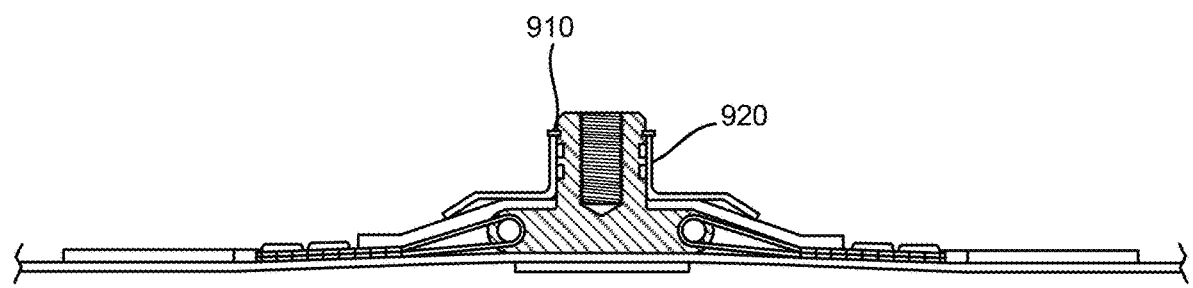
FIG. 9 depicts an example of a diagram representative of an assembled view of a bladder flange, a felt washer, and the bracket fixture.

FIG. 9 depicts an example of a diagram representative of an assembled view of a bladder flange 610, a felt washer 810, and the bracket fixture 200. The partially inverted thermoformed cone 710 may collapse when the space habitat is pressurized.

In some embodiments, the protrusion 260 may include retaining ring groove 910. The retaining ring groove 910 may provide an additional element of securing the heavy load to the soft goods. For example, the retaining ring groove 910 may be configured to receive a retaining ring 920 to compress the bladder flange 610 over the bracket fixture 200.

The bladder flange 610 may be configured to connect to a retaining ring 920 at the bracket fixture 200 to retain the bladder flange 610. The bladder flange 610 may be restrained to the bracket fixture 200 by a retaining ring 920. In some embodiments, the retaining ring 920 may engage with the O-rings on the protrusion 260 of the bracket fixture 200. The engagement of the bladder flange 610 with the O-rings may create an airtight seal. The retaining ring 920 may be placed over the bladder flange 610 to prevent movement of the bladder flange 610 with respect to the bracket fixture 200.

Figure 10A:
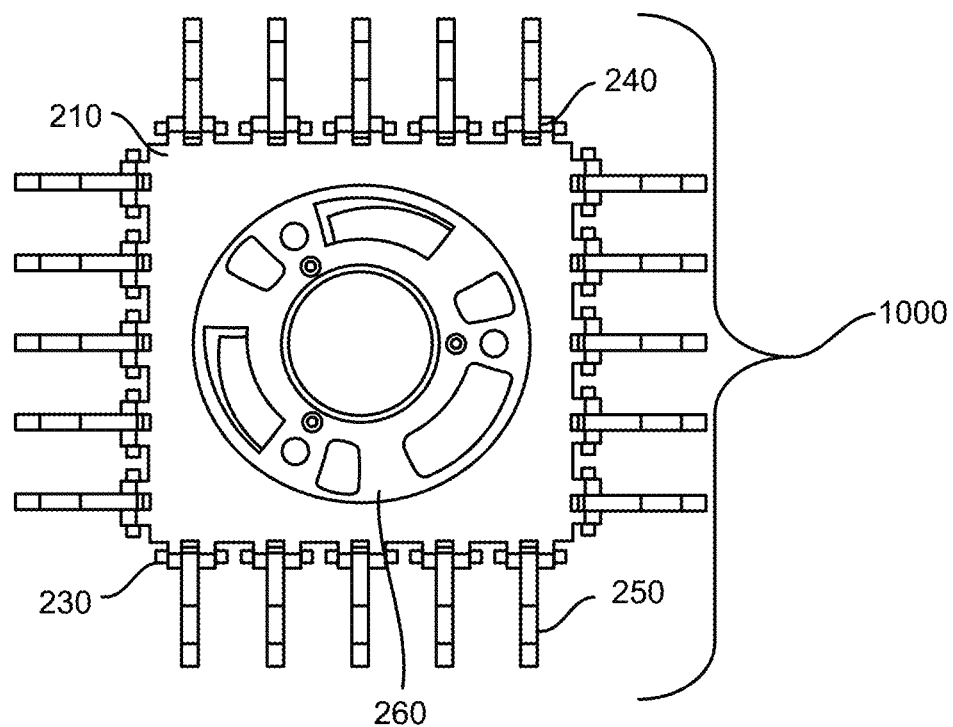
FIG. 10A depicts an example of a diagram representative of a top-view of a bracket fixture attachable to the exterior portion of a space habitat.

FIG. 10A depicts an example of a diagram representative of a top-view of an exterior bracket fixture 1000 attachable to the exterior portion of a space habitat. The space habitat may need to attach to external spacecraft to immobilize the space habitat. Additionally, the space habitat may need to attach robots that manipulate devices out in space. The exterior bracket fixture 1000 may connect the heavy loads (e.g., spacecraft, robots) to the soft goods surrounding the bladder 120. Mounting the exterior bracket fixture 1000 to the webbing prevents safety hazards due to the added heavy loads. The exterior bracket fixture 1000 may interface with the soft goods (e.g., the hoop and axial webbing) to properly secure heavy habitat structures while still providing a safe, pressurized internal environment.

The exterior bracket fixture 1000 may include a base 210. The base 210 may include a flat surface that may be mounted to the exterior portion of a space habitat. The flat surface of the base 210 may maintain contact with the soft goods (e.g., webbing). The flat surface may be on the backside of the base 210. The flat surface of the exterior bracket fixture 1000 may be flush against the exterior portion of the space habitat. For example, the flat surface may be mounted to soft goods on the space habitat covering the bladder 120. The exterior bracket fixture 1000 may be centered on the intersection of a pair of hoop and axial webbings. In some embodiments, the backside of the base 210 may be curved to match the contour of the bladder 120.

The base 210 of the exterior bracket fixture 1000 may include four sides. Each of the sides may provide in-plane load support for the space habitat. The base 210 may have a square, parallelogram, or rectangular shape base 210 on the four sides. The four sides may be perpendicular to one another. The corners of the base 210 may form right angles. The sides of the base 210 may be aligned with a webbing. For example, the base 210 may have four sides to correspond to a cross-hatch style webbing. In some embodiments, the base 210 may be located on one of the axial/hoop webbing crossover points.

Each of the four sides may include an attachment element that attaches to the soft goods. In some embodiments, each of the four sides may include a pin 230. The pin 230 may extend parallel to its respective side. The pin 230 may have a cylindrical shape and may be detachable from the side of the base 210. The pin 230 may be situated to create an aperture between the pin 230 and the respective side of the base 210. The aperture may allow a loop to wrap around the pin 230 between the pin 230 and the side of the base 210. Additionally, and/or alternatively, the aperture may be built into the side of the base 210. For example, the aperture may be a slot at each of the four sides. In some embodiments, the aperture may be created directly at the base 210. As such, the pin 230 at each of the sides may be integrated into each of the sides. The pin 230 may secure the exterior bracket fixture 1000 to the soft goods to provide in-plane load support for the space habitat. In some embodiments, each of the four sides may include multiple pins for attaching to multiple webbings at each side. For example, each of the four sides may include five pins for attaching multiple webbings to each side of the base 210. In some embodiments, the sides may include a clevis fastener including a clevis and a clevis pin. The clevis pin may be a bolt with a cross-hole for a clevis pin.

Each of the four sides may include at least two members 240. The two members 240 may form a U-shape. The two members 240 may extend horizontally from the base 210. The bottom portion of the two members 240 may be flush with the flat surface of the base 210. The top portion of the two members 240 may be flush with the top edge of the base 210. The two members 240 may extend from opposite ends of the side. For example, the two members 240 may extend from the corners formed by the sides. The two members 240 may be approximately perpendicular to its respective side. In some embodiments, the two members 240 may extend at an approximately perpendicular angle from its respective side at the corners of the base 210. The two members 240 may be spaced apart from each other as they extend horizontally from its respective side. Two members 240 may be configured to sustain a pin 230. In some embodiments, each of the four sides may include five pins for attaching multiple webbings to each side of the base 210. As such, there may be 10 members each configured to secure one of the five pins along the side of the base 210. The sides may include another number of pins and, as such, additional members may be added to support the number of pins.

Each of the members may include an opening at the distal end. The opening at the distal end may be configured to receive the pin 230. The pin 230 may extend at an approximately perpendicular angle from the two members 240. The pin 230 may be configured to fit in the opening of the two members 240. The pin 230 may be configured to be detachable from the two members 240. The pin 230 may extend beyond the opening in the two members 240 to the other side. The pin 230 may have a thicker diameter at the portion extending beyond the opening than the portion between the two members 240. In some embodiments, the pin 230 may be cylindrical to fit in the openings of the two members 240. Additionally, and/or alternatively, the pin 230 may have a rectangular shape, a square shape, a hexagonal shape, and/or the like. The alternative shapes of the pin 230 may increase the friction of the webbing loop 250 around the pin 230. The pin 230 may be a clevis pin configured to engage the webbing loop 250 that is sewn to the webbing restraint.

Each of the pins may have a webbing loop 250 wrapped around it. The webbing loop 250 may be configured to wrap around the pin 230 to secure the base 210 to the exterior surface of soft goods. The webbing loop 250 may include one end for wrapping around the pin 230 and another end for attaching to the exterior surface of the soft goods. The end for attaching to the interior wall may be attached via a fastener, ties, staples, stitches, knots, and/or the like. The end of the webbing loop 250 may connect to a webbing, a bladder 120, a strap, a liner, and/or the like at the interior wall of the soft goods. The webbing loop 250 may be made of Kevlar. In some embodiments, the loading of the exterior bracket fixture 1000 may result in the tensile loading of the webbing loop 250. The tensile loading of the webbing loop 250 may transfer the load attached to the exterior bracket fixture 1000 onto the webbing of the soft goods.

The base 210 may include a protrusion 260. The protrusion 260 may be centered in the base 210 and extend away from the exterior wall of the soft goods. The exterior bracket fixture 1000 may include cutouts to allow for wiring, bolting, and robotic installation and interfacing. In some embodiments, the protrusion 260 may include a fixture element to support a load. The fixture element may include at least one of a hook, a slot, an opening, and a female threading. The female threading may be configured to receive a bolt or a screw from the load. The protrusion 260 may extend at an angle approximately perpendicular to the base 210. The protrusion 260 may have a cylindrical shape with a diameter wider than the female threading.

In some embodiments, the base 210 may include a cord loop aperture 270. The cord loop aperture 270 may be in the corner of the base 210. A cord loop made of Vectran may loop through the cord loop aperture 270 and connect to the webbing directly beneath the base 210 of the bracket. The cord loop may prevent the exterior bracket fixture 1000 from being pulled away from the restraint layer. In some embodiments, a cord loop aperture 270 may be in each corner of the base 210 to connect the cord loop directly beneath the base 210 of the bracket. The cord loop wrapping through the cord loop aperture 270 may prevent separation between the webbing and the bottom surface of the base 210. In some embodiments, the cord loops may pass through the restraint webbing and holes in the corners of the exterior bracket fixture 1000 to further immobilize the exterior bracket fixture 1000.

Figure 10B:
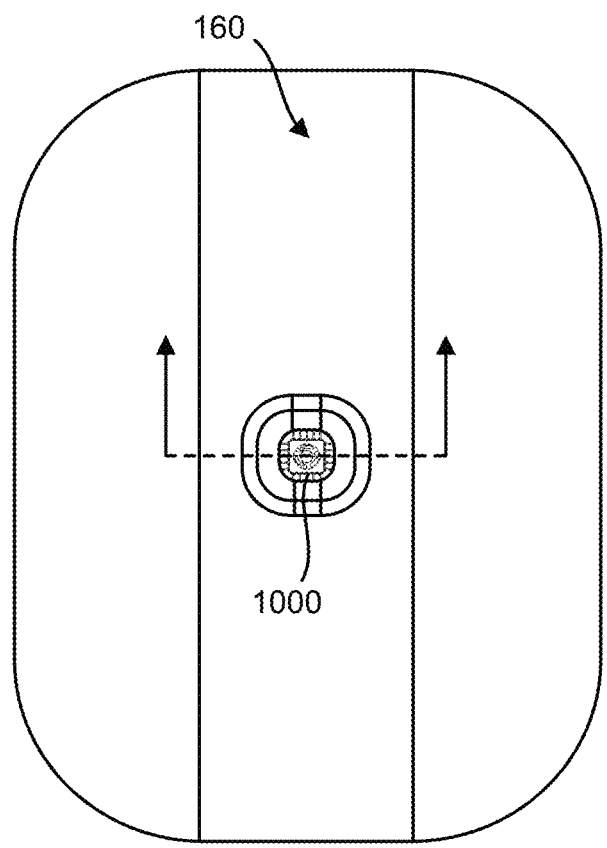
FIG. 10B depicts an example of a diagram representative of a bracket fixture situated in an opening on the exterior portion of the space habitat.

FIG. 10B depicts an example of a diagram representative of an exterior bracket fixture 1000 situated in an opening on the exterior portion of the space habitat. A cutout of a debris shield 160 may create an opening in the exterior portion of the space habitat. The exterior bracket fixture 1000 may be situated inside of the opening in the debris shield 160. The exterior bracket fixture 1000 may be configured to attach to the exterior surface of the soft goods layer 150. The exterior bracket fixture 1000 may be configured to attach to an external space structure. The exterior bracket fixture 1000 may include cutouts to allow for wiring or bolting to the external space structure. Additionally, and/or alternatively, the exterior bracket fixture 1000 may include cutouts to connect a robot to the exterior bracket fixture 1000.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

While the foregoing is directed to implementations of the present disclosure, other and further implementations of the disclosure may be devised without departing from the basic scope thereof, and the scope thereof is determined by the claims that follow.

What is claimed is:

1. A bracket fixture for securing a load the bracket fixture comprising:
   a base having a top surface, a first set of opposing sides, and a second set of opposing sides, the first set of opposing sides being situated at opposite ends of the top surface along a first direction, and the second set of opposing sides being situated at opposite ends of the top surface along a second direction, each opposing side of the first set of opposing sides and each opposing side of the second set of opposing sides having at least two members extending laterally from the base for sustaining a pin;
   a protrusion extending from the top surface of the base for sustaining the load; and
   a bladder flange having a flange opening forming a circular wall configured to receive the protrusion, and the bladder flange having a flange base extending laterally from the flange opening at a bottom portion of the circular wall, wherein the first direction and the second direction are approximately perpendicular to each other.

2. The bracket fixture of claim 1, wherein the at least two members are configured to extend parallel to one another, wherein the at least two members are separated by the pin, and wherein the pin is configured to connect to the at least two members at distal ends of the at least two members.

3. The bracket fixture of claim 1, wherein the pin is detachable, wherein the protrusion is centered on the base, and wherein the protrusion includes at least one of a hook, a slot, an opening, and a female threading.

4. The bracket fixture of claim 2, wherein the distal ends of the at least two members have openings for receiving the pin.

5. The bracket fixture of claim 2, wherein the protrusion extends at an angle approximately perpendicular from the base, and wherein the pin is configured to connect at the distal ends of the two members to form an aperture between the pin and the base.

6. The bracket fixture of claim 1, further comprising:
a webbing loop wrapped around the pin to secure the base to a soft goods layer, the webbing loop configured to pass through an aperture between the pin and the base.

7. The bracket fixture of claim 6, further comprising:
a cord loop aperture formed at a corner of the base, the cord loop aperture being distinct from the aperture between the pin and the base, the cord loop aperture configured to receive a cord loop connected directly beneath the base of the bracket fixture to prevent separation between the base and the soft goods layer.

8. The bracket fixture of claim 1, further comprising:
a thermoformed cone bonded to an underside of the flange base,
wherein the bladder flange configured to cover the top surface, the first set of opposing sides, and the second set of opposing sides, and
wherein the bladder flange is configured to be placed over the protrusion and the thermoformed cone provides a protective layer for a bladder.

9. The bracket fixture of claim 8, further comprising:
an O-ring around a circumference of the protrusion,
wherein the placing the bladder flange over the O-ring creates a seal around the O-ring.

10. A method for securing a bracket fixture to a space habitat with a bladder, the method comprising:
securing the bracket fixture to a soft goods layer covering the bladder, the bracket fixture including a base having a top surface, a first set of opposing sides, and a second set of opposing sides, the first set of opposing sides being situated at opposite ends of the top surface along a first direction, and the second set of opposing sides being situated at opposite ends of the top surface along a second direction, each opposing side of the first set of opposing sides and each opposing side of the second set of opposing sides having at least two members extending laterally from the base for sustaining a pin, the bracket fixture further including a protrusion extending from the top surface of the base, the first direction and the second direction being approximately perpendicular to each other; and
placing a bladder flange over the bracket fixture, the bladder flange having a flange opening forming a circular wall configured to receive the protrusion, and the bladder flange having a flange base extending laterally from the flange opening at a bottom portion of the circular wall.

11. The method of claim 10, further comprising:
securing a felt washer over the protrusion of the bracket fixture to cushion the bladder from the bracket fixture, the felt washer configured to cover a portion of the bladder proximate to the bladder flange.

12. The method of claim 10, further comprising:
placing a retaining ring over the bladder flange to prevent movement of the bladder flange with respect to the bracket fixture.

13. The method of claim 10, wherein the protrusion includes an O-ring around its circumference and wherein placing the bladder flange over the O-ring creates a seal around the O-ring.

14. A bracket fixture system for securing a load to a soft goods layer in a space habitat, the bracket fixture system comprising:
a bracket fixture including a base having a top surface, a first set of opposing sides, and a second set of opposing sides, the first set of opposing sides being situated at opposite ends of the top surface along a first direction, and the second set of opposing sides being situated at opposite ends of the top surface along a second direction, the base having a protrusion extending from the base, each opposing side of the first set of opposing sides and each opposing side of the second set of opposing sides having at least two members extending laterally from the base for sustaining a pin;
a bladder flange having a flange opening forming a circular wall configured to receive the protrusion, and the bladder flange having a flange base extending laterally from the flange opening at a bottom portion of the circular wall; and
a webbing loop wrapped around the pin to secure the base to the soft goods layer, the webbing loop configured to pass through an aperture between the pin and the base,
wherein the webbing loop is configured to attach to the soft goods layer at the space habitat, wherein the first direction and the second direction are approximately perpendicular to each other.

15. The bracket fixture system of claim 14, wherein the protrusion is centered on the base, and the protrusion includes at least one of a hook, a slot, an opening, and a female threading.

16. The bracket fixture system of claim 14, further comprising:
a thermoformed cone bonded to an underside of the flange base,
wherein the bladder flange configured to cover the top surface, the first set of opposing sides, and the second set of opposing sides, and
wherein the bladder flange is configured to be placed over the protrusion and the thermoformed cone provides a protective layer for a bladder.

17. The bracket fixture system of claim 14, wherein the at least two members are configured to extend parallel to one another, wherein the at least two members are separated by the pin, and wherein the pin is configured to connect to the at least two members at distal ends of the at least two members.

18. The bracket fixture system of claim 17, wherein the protrusion extends at an angle approximately perpendicular from the base, and wherein the pin is configured to connect at the distal ends of the two members to form the aperture between the pin and the base.

19. The bracket fixture system of claim 14, wherein the pin is detachable.

20. The bracket fixture system of claim 19, further comprising:
   a cord loop aperture formed at a corner of the base, the cord loop aperture being distinct from the aperture between the pin and the base, the cord loop aperture configured to receive a cord loop connected directly beneath the base of the bracket fixture to prevent separation between the base and the soft goods layer.

* * * * *